United States Patent
Suzuki et al.

(10) Patent No.: US 11,137,065 B2
(45) Date of Patent: Oct. 5, 2021

(54) VEHICLE CONTROL SYSTEM

(71) Applicant: HONDA MOTOR CO., LTD., Tokyo (JP)

(72) Inventors: Takeyuki Suzuki, Saitama (JP); Takashi Yanagi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/021,084

(22) Filed: Sep. 15, 2020

(65) Prior Publication Data

US 2021/0088128 A1 Mar. 25, 2021

(30) Foreign Application Priority Data

Sep. 19, 2019 (JP) .............................. JP2019-170088

(51) Int. Cl.
*F16H 59/70* (2006.01)
*F16H 59/44* (2006.01)
*F16H 59/10* (2006.01)

(52) U.S. Cl.
CPC ........... *F16H 59/44* (2013.01); *F16H 59/105* (2013.01); *F16H 59/70* (2013.01); *F16H 2059/443* (2013.01); *F16H 2059/446* (2013.01); *F16H 2312/09* (2013.01)

(58) Field of Classification Search
CPC ........ F16H 59/44; F16H 59/70; F16H 59/105; F16H 59/58; F16H 2059/443; F16H 5059/446; F16H 2312/09
See application file for complete search history.

(56) References Cited

U.S. PATENT DOCUMENTS

| | | | | |
|---|---|---|---|---|
| 4,735,274 A | * | 4/1988 | Good | B62D 15/0285 180/167 |
| 2015/0251563 A1 | * | 9/2015 | Shirokura | B60L 15/38 701/22 |
| 2018/0312190 A1 | * | 11/2018 | Nakade | F16H 61/12 |
| 2019/0301599 A1 | * | 10/2019 | Bulgrien | F16H 3/093 |

FOREIGN PATENT DOCUMENTS

JP     2018194916 A     12/2018

\* cited by examiner

*Primary Examiner* — Edwin A Young
(74) *Attorney, Agent, or Firm* — Armstrong Teasdale LLP

(57) ABSTRACT

A vehicle control system includes: an operation element; a travel control unit configured to accelerate or decelerate a vehicle; and a shift range control unit configured to control a shift range of the vehicle. In a state where the shift range of the vehicle is set to a first travel range, the travel control unit accelerates the vehicle according to a moving operation on the operation element in a first travel direction and decelerates the vehicle according to the moving operation on the operation element in a second travel direction. In a state where the shift range of the vehicle is set to a second travel range, the travel control unit accelerates the vehicle according to the moving operation on the operation element in the second travel direction and decelerates the vehicle according to the moving operation on the operation element in the first travel direction.

11 Claims, 10 Drawing Sheets

Fig.5
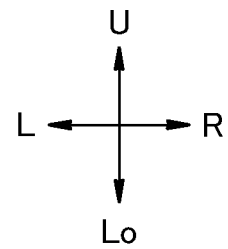
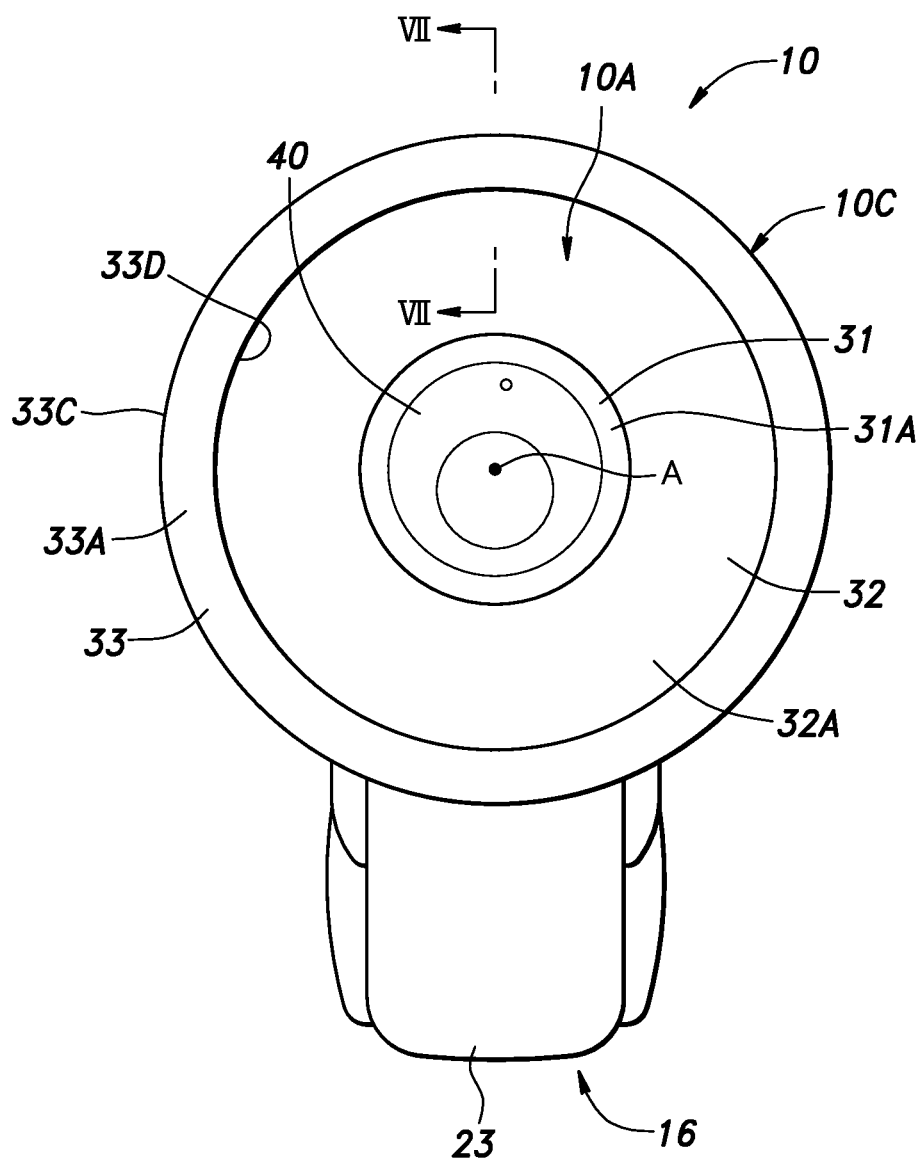

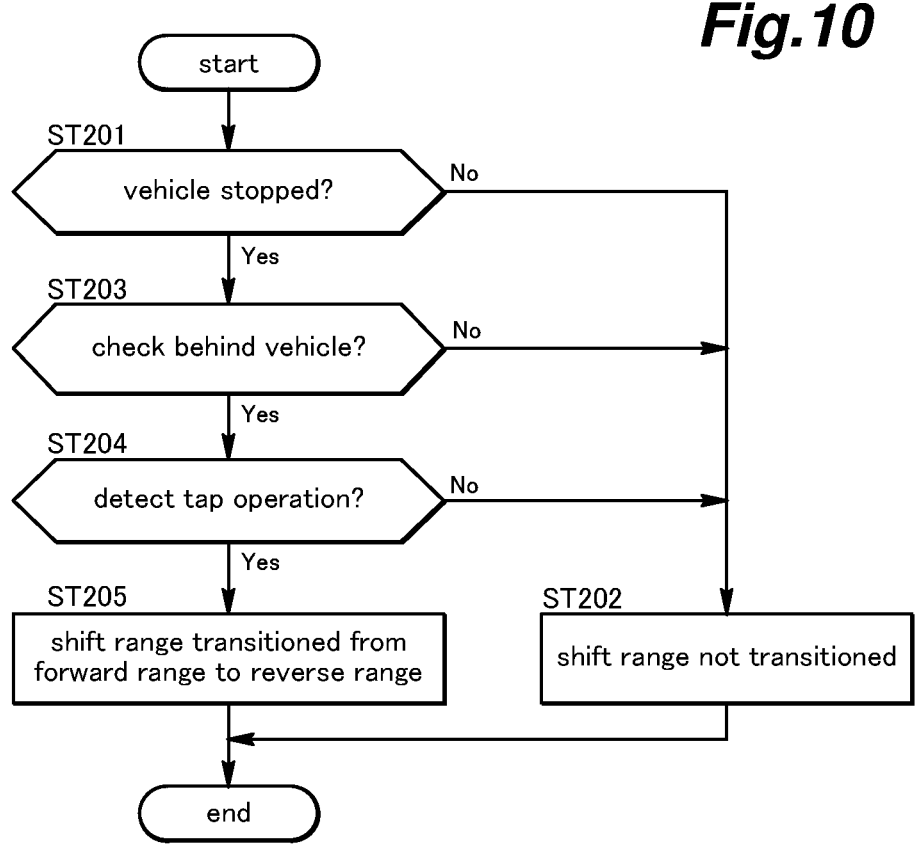

VEHICLE CONTROL SYSTEM

TECHNICAL FIELD

The present invention relates to a vehicle control system.

BACKGROUND ART

A vehicle control system known in the art accelerates or decelerates a vehicle according to an acceleration/deceleration operation on an operation element by an occupant (for example, JP2018-194916A).

In the above vehicle control system, if the travel direction of the vehicle does not match the direction of the acceleration/deceleration operation on the operation element, the occupant cannot intuitively perform the acceleration/deceleration operation on the operation element, which may deteriorate the operability of the acceleration/deceleration operation on the operation element.

SUMMARY OF THE INVENTION

In view of such a problem of the prior art, a primary object of the present invention is to provide a vehicle control system that can improve the operability of the acceleration/deceleration operation on the operation element.

To achieve such an object, one embodiment of the present invention provides a vehicle control system (1) including: an operation element (10) movable in a first travel direction and a second travel direction of a vehicle (2) with respect to a vehicle body (15); a travel control unit (12) configured to accelerate or decelerate the vehicle according to a moving operation on the operation element in the first travel direction or the second travel direction; and a shift range control unit (70) configured to control a shift range of the vehicle, wherein in a state where the shift range of the vehicle is set to a first travel range, the travel control unit accelerates the vehicle according to the moving operation on the operation element in the first travel direction and decelerates the vehicle according to the moving operation on the operation element in the second travel direction, and in a state where the shift range of the vehicle is set to a second travel range, the travel control unit accelerates the vehicle according to the moving operation on the operation element in the second travel direction and decelerates the vehicle according to the moving operation on the operation element in the first travel direction.

According to this arrangement, both when the vehicle is traveling in the first travel direction and when the vehicle is traveling in the second travel direction, the travel direction of the vehicle matches the direction of the acceleration/deceleration operation (namely, the moving operation) on the operation element. Accordingly, both when the vehicle is traveling in the first travel direction and when the vehicle is traveling in the second travel direction, the occupant can intuitively perform the acceleration/deceleration operation on the operation element, so that the operability of the acceleration/deceleration operation on the operation element can be improved.

In the above arrangement, preferably, in a case where the moving operation on the operation element in the first travel direction or the second travel direction is stopped in the state where the shift range of the vehicle is set to the first travel range, the shift range control unit maintains the shift range of the vehicle at the first travel range, and in a case where the moving operation on the operation element in the first travel direction or the second travel direction is stopped in the state where the shift range of the vehicle is set to the second travel range, the shift range control unit transitions the shift range of the vehicle from the second travel range to a neutral range or a parking range.

According to this arrangement, in a case where the moving operation on the operation element in the first travel direction or the second travel direction is stopped in the state where the shift range of the vehicle is set to the first travel range, the shift range of the vehicle is maintained at the first travel range, so that the convenience of the vehicle control system can be improved. On the other hand, in a case where the moving operation on the operation element in the first travel direction or the second travel direction is stopped in the state where the shift range of the vehicle is set to the second travel range, the shift range of the vehicle is transitioned from the second travel range to the neutral range or the parking range. Accordingly, it is possible to check whether the occupant intends to move the vehicle in the second travel direction every time the moving operation is stopped.

In the above arrangement, preferably, a direction along an axis (A) of the operation element is set to a first direction (Y), a direction toward a first side in the first direction is set to the first travel direction and a direction toward a second side in the first direction is set to the second travel direction, and the operation element is configured to receive a turning operation around the axis.

According to this arrangement, a single operation element can receive both the acceleration/deceleration operation (namely, the moving operation) and the steering operation (namely, the turning operation). Accordingly, the configuration of the vehicle control system can be simplified as compared with a case where separate operation elements receive the acceleration/deceleration operation and the steering operation. Further, in a case where the occupant intends to turn the vehicle while moving the vehicle in the second travel direction, the occupant can turn the operation element while moving the operation element in the second travel direction, so that the occupant can easily operate the operation element.

In the above arrangement, preferably, the vehicle control system further includes a contact sensor (35 to 37) configured to detect a contact operation on the operation element, wherein on condition that the contact sensor detects a prescribed contact operation on the operation element in the state where the shift range of the vehicle is set to the first travel range, the shift range control unit transitions the shift range of the vehicle from the first travel range to the second travel range.

According to this arrangement, the shift range of the vehicle can be transitioned according to the contact operation on the operation element by the occupant. Thus, the shift range of the vehicle can be transitioned based on the intention of the occupant.

In the above arrangement, preferably, on condition that the operation element receives the moving operation in the second travel direction in a state where the shift range of the vehicle is set to the first travel range and the vehicle stops traveling, the shift range control unit transitions the shift range of the vehicle from the first travel range to the second travel range.

According to this arrangement, the shift range of the vehicle can be transitioned according to the moving operation on the operation element in the second travel direction by the occupant. Thus, the shift range of the vehicle can be transitioned based on the intention of the occupant.

In the above arrangement, preferably, the vehicle control system further includes: an external environment recognizing device (46) configured to detect a current position of the vehicle or surrounding information about the vehicle; and an area determining unit (74) configured to determine whether the vehicle is present in an area where the vehicle can travel in the second travel range based on the current position of the vehicle or the surrounding information about the vehicle detected by the external environment recognizing device, wherein on condition that the area determining unit determines that the vehicle is present in the area where the vehicle can travel in the second travel range in the state where the shift range of the vehicle is set to the first travel range, the shift range control unit transitions the shift range of the vehicle from the first travel range to the second travel range.

According to this arrangement, the vehicle can be moved in the second travel direction in an appropriate area.

In the above arrangement, preferably, the vehicle control system further includes: an image capturing device (26) configured to capture an image of an occupant; and a check determining unit (73) configured to determine whether the occupant checks the second travel direction based on the image of the occupant captured by the image capturing device, wherein on condition that the check determining unit determines that the occupant checks the second travel direction in the state where the shift range of the vehicle is set to the first travel range, the shift range control unit transitions the shift range of the vehicle from the first travel range to the second travel range.

According to this arrangement, the shift range of the vehicle can be transitioned according to the check on the second travel direction by the occupant. Thus, the shift range of the vehicle can be transitioned based on the intention of the occupant.

In the above arrangement, preferably, the vehicle control system further includes a contact sensor (35 to 37) configured to detect a contact operation on the operation element, wherein when the operation element receives the moving operation in the second travel direction and the contact sensor detects a prescribed contact operation on the operation element in the state where the shift range of the vehicle is set to the second travel range, the travel control unit executes constant speed control of the vehicle.

According to this arrangement, the constant speed control causes the vehicle to travel at a constant speed, thereby reducing the operation load on the occupant.

In the above arrangement, preferably, the vehicle control system further includes: an image capturing device (26) configured to capture an image of an occupant; and a check determining unit (73) configured to determine whether the occupant checks the second travel direction based on the image of the occupant captured by the image capturing device, wherein while the check determining unit keeps on determining, at prescribed reference intervals, that the occupant checks the second travel direction in a state where the shift range of the vehicle is set to the second travel range and the vehicle is traveling, the travel control unit keeps on causing the vehicle to travel.

According to this arrangement, in a case where the occupant keeps on checking the second travel direction, it is possible to keep on causing the vehicle to travel in the second travel direction. Thus, the movement of the vehicle in the second travel direction can be continued based on the intention of the occupant.

In the above arrangement, preferably, in a case where the operation element receives the moving operation in the second travel direction more than a threshold of an operation amount in the state where the shift range of the vehicle is set to the second travel range, the travel control unit stops acceleration of the vehicle.

According to this arrangement, the vehicle can be prevented from traveling in the second travel direction at unnecessarily high speed.

In the above arrangement, preferably, the first travel direction is a forward direction, the second travel direction is a rearward direction, the first travel range is a forward range to cause the vehicle to travel forward, and the second travel range is a reverse range to reverse the vehicle.

According to this arrangement, the occupant can more intuitively perform the acceleration/deceleration operation on the operation element, so that the operability of the acceleration/deceleration operation on the operation element can be further improved.

Thus, according to the above arrangements, it is possible to provide a vehicle control system that can improve the operability of the acceleration/deceleration operation on the operation element.

BRIEF DESCRIPTION OF THE DRAWING(S)

FIG. 5 is a rear view of the operation element and the moving device;

FIG. 10 is a flowchart showing transition control of a shift range.

DESCRIPTION OF THE PREFERRED EMBODIMENT(S)

In the following, an embodiment of a vehicle control system 1 according to the present invention will be described with reference to the drawings. Arrows Fr, Re, L, R, U, and Lo, which are appropriately attached to FIG. 2 and subsequent drawings, respectively indicate a front side, a rear side, a left side, a right side, an upper side, and a lower side of a vehicle 2 in which the vehicle control system 1 is provided. In the present embodiment, the lateral direction is defined as the vehicle width direction of the vehicle 2, and the fore and aft direction is defined as the vehicle length direction of the vehicle 2.

<The Configuration of the Vehicle Control System 1>

Figure 1:
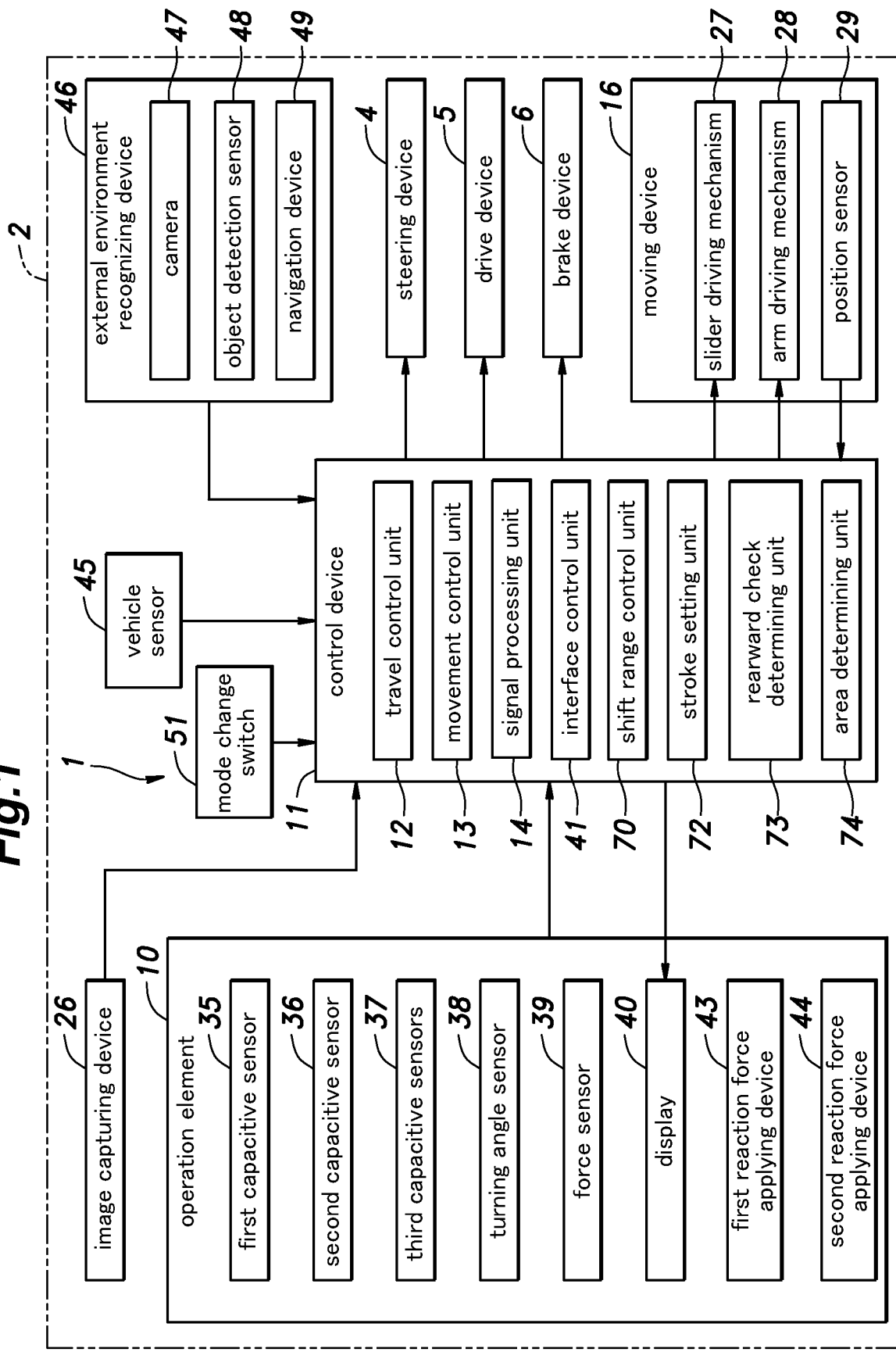
FIG. 1 is a block diagram of a vehicle control system according to an embodiment of the present invention.

As shown in FIG. 1, the vehicle control system 1 is provided in a vehicle 2 which is capable of autonomous driving. The vehicle 2 can travel either in a manual driving mode in which an occupant X mainly performs a driving operation or in an autonomous driving mode in which the vehicle 2 (more specifically, an undermentioned control device 11) mainly performs the driving operation. The vehicle 2 includes a steering device 4 configured to steer wheels of the vehicle 2, a drive device 5 configured to rotate the wheels, and a brake device 6 configured to apply the brakes to the wheels.

The steering device 4 is a device configured to change a steering angle of the wheels, and includes an electric motor and a steering mechanism configured to steer the wheels by a driving force of the electric motor. The steering mechanism includes, for example, a rack-and-pinion mechanism. The drive device 5 is a device configured to rotate the wheels, and includes at least one of an electric motor and an internal combustion engine. The drive device 5 further includes a transmission mechanism configured to transmit a driving force of the at least one of the electric motor and the internal combustion engine to the wheels. If the drive device 5 includes the internal combustion engine, the drive device 5 can apply the brakes to the wheels by engine braking. If the drive device 5 includes the electric motor, the drive device 5 can apply the brakes to the wheels by regenerative braking. The brake device 6 is a device configured to apply resistance to the wheels and thus stop the rotation of the wheels. The brake device 6 includes an electric motor, a hydraulic pressure generating device configured to generate hydraulic pressure as the electric motor is driven, and a brake caliper that presses a brake pad against a brake rotor on receiving the hydraulic pressure from the hydraulic pressure generating device.

The vehicle control system 1 includes an operation element 10 provided with various sensors and a control device 11 connected to the operation element 10. The operation element 10 is a device configured to receive a driving operation by the occupant X to steer the vehicle 2. The operation element 10 may include, for example, a steering wheel or a control stick. An outline of the operation element 10 may be formed in a shape such as a circular shape, a rectangular shape, a shape formed by cutting off a part of a circle, or a shape formed by combining left and right arc parts and upper and lower straight-line parts. The control device 11 includes a hardware processor such as a CPU. The control device 11 includes a travel control unit 12, a movement control unit 13, and a signal processing unit 14. The signal processing unit 14 is configured to detect an operation input by the occupant X based on a signal from the operation element 10, and the travel control unit 12 is configured to control at least one of the steering device 4, the drive device 5, and the brake device 6 according to the operation input detected by the signal processing unit 14. The movement control unit 13 is configured to control the movement of the operation element 10 according to the operation input detected by the signal processing unit 14.

Figure 2:
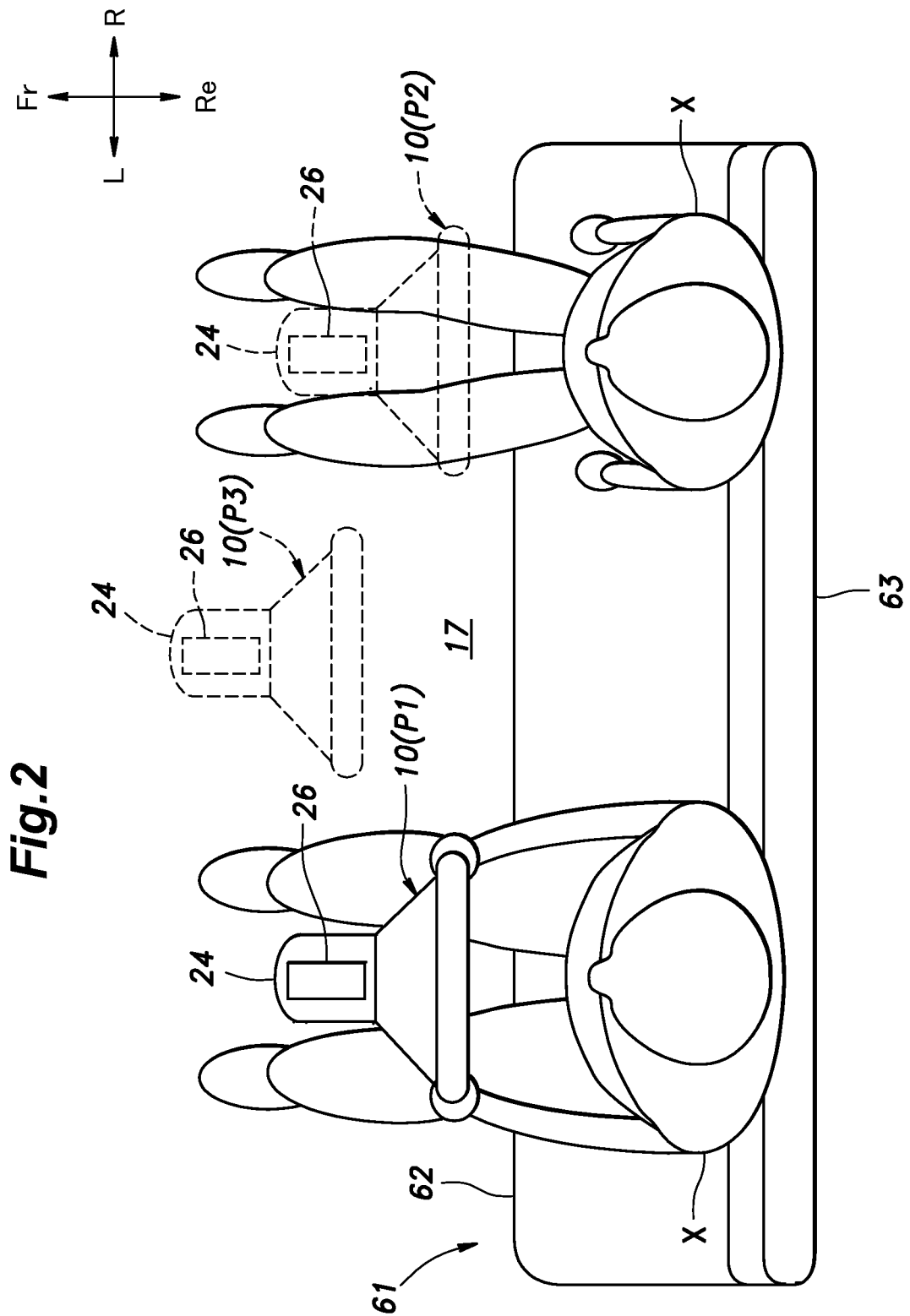
FIG. 2 is a plan view of a front part of a vehicle.
Figure 3:
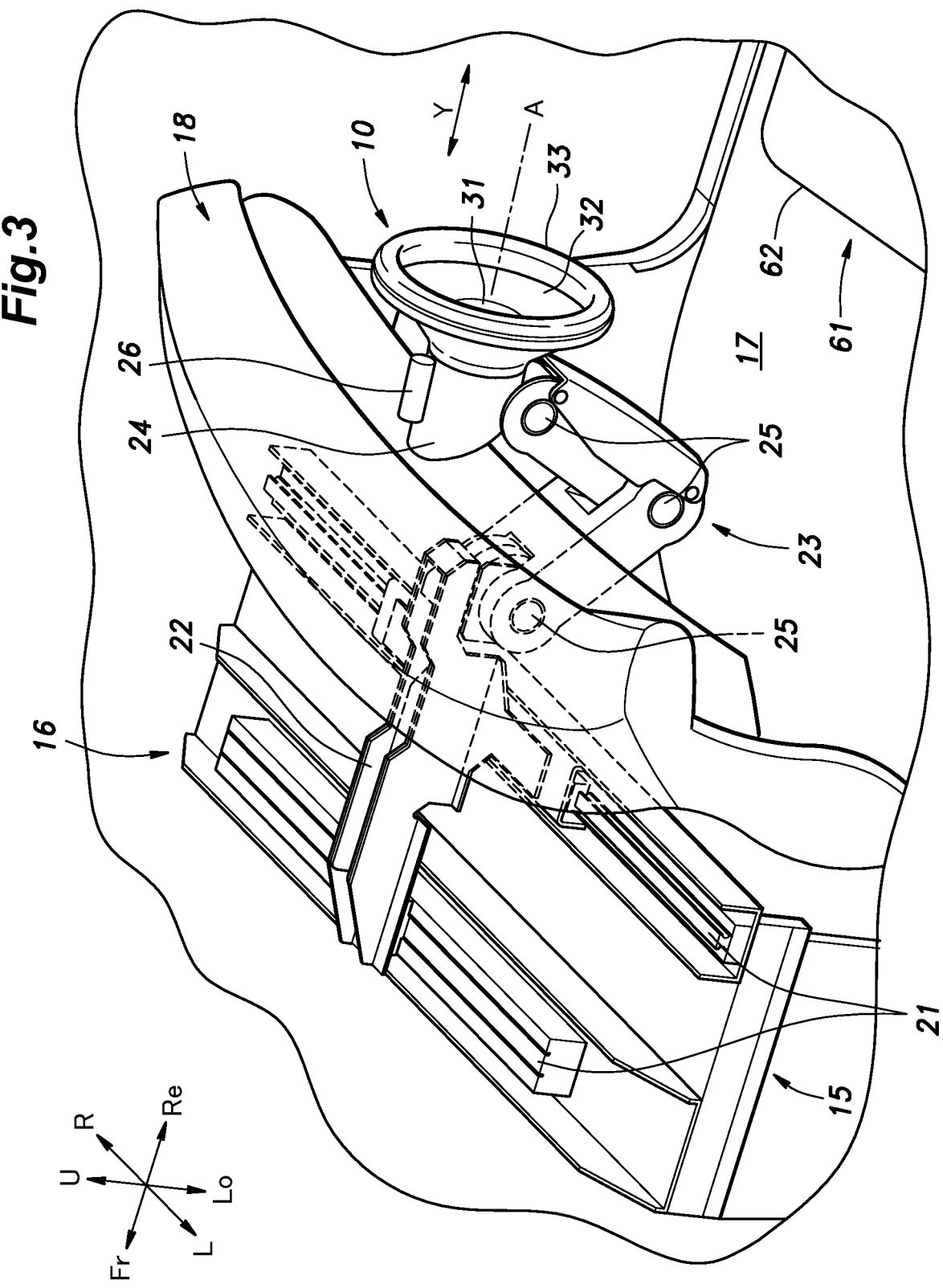
FIG. 3 is a perspective view of the front part of the vehicle.

As shown in FIGS. 2 and 3, a vehicle cabin 17 of the vehicle 2 is provided with an occupant seat 61 on which at least one occupant X (two occupants X are shown in FIG. 2) that performs the driving operation on the operation element 10 is seated. The occupant seat 61 is, for example, a bench seat having a seating space for plural persons, and extends along the lateral direction. By using such a bench seat as the occupant seat 61 in this way, a degree of flexibility in the seating position of the occupant X in the lateral direction can be increased. The occupant seat 61 is attached to a front part of a vehicle body 15 of the vehicle 2 via a base member (not shown). The occupant seat 61 includes a seat cushion 62 on which the occupant X is seated and a seat back 63 provided adjacently to the seat cushion 62 on an upper rear side thereof so as to support the occupant X from a rear side. The seat cushion 62 and the seat back 63 each have a prescribed width in the lateral direction (for example, a width for plural occupants X).

Figure 4:
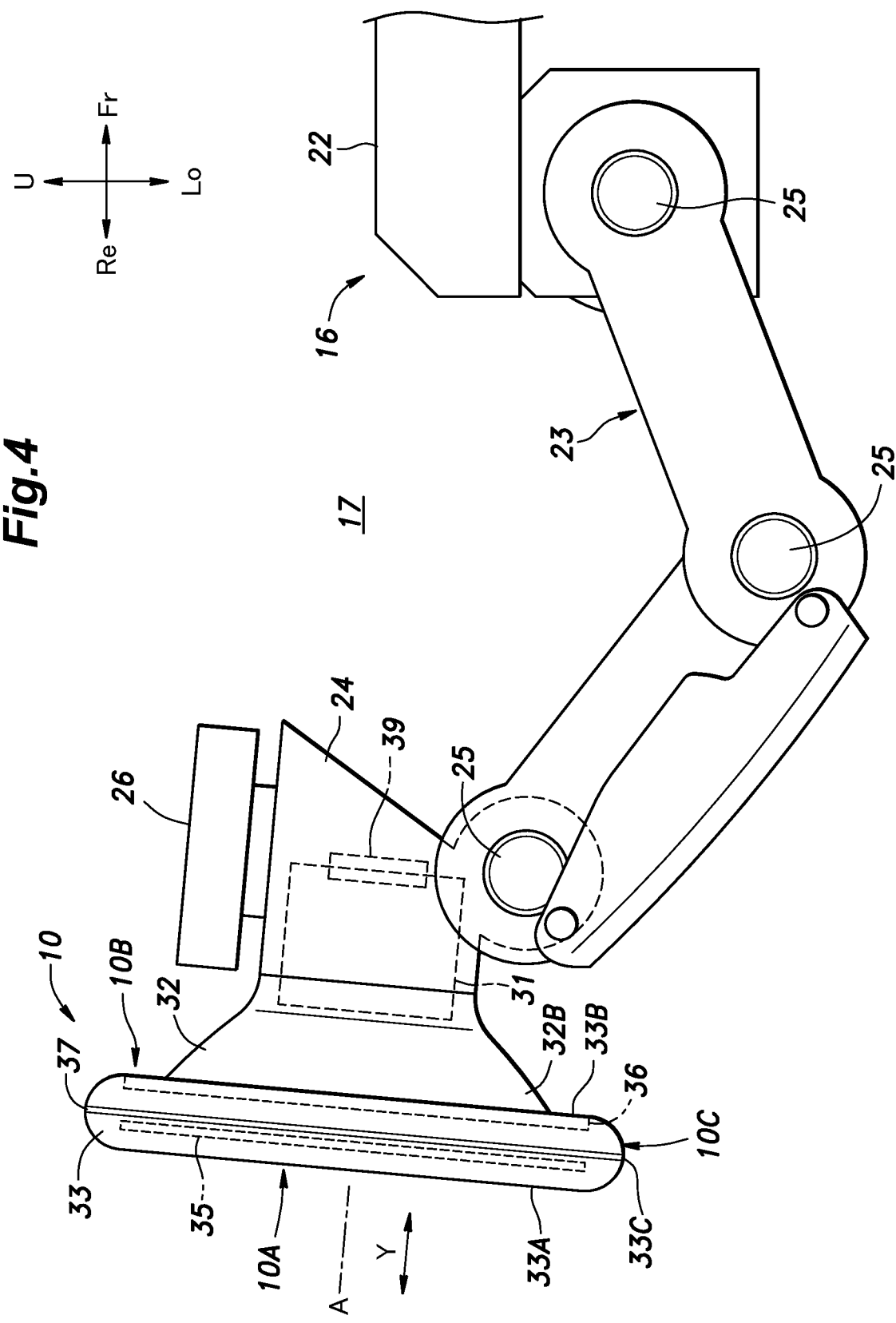
FIG. 4 is a side view of an operation element and a moving device.

As shown in FIGS. 3 and 4, the operation element 10 is supported by the front part of the vehicle body 15 via a moving device 16. The moving device 16 includes a pair of front and rear rails 21 provided on the front part of the vehicle body 15 and extending in the lateral direction, a slider 22 extending in the fore and aft direction so as to be provided between the pair of front and rear rails 21, an arm 23 extending rearward from the slider 22, and a base 24 provided at a rear end of the arm 23 and attached to the operation element 10.

The pair of front and rear rails 21 support the slider 22 such that the slider 22 is movable in the lateral direction. The pair of front and rear rails 21 and the slider 22 are provided in front of an instrument panel 18 that forms a front wall of the vehicle cabin 17 of the vehicle 2. Accordingly, the pair of front and rear rails 21 and the slider 22 are invisible or hardly seen from the occupant X in the vehicle cabin 17 of the vehicle 2, so that the design of the vehicle 2 is improved.

The arm 23 includes joints 25, and passes below the instrument panel 18 in a state where the joints 25 are bent such that the arm 23 protrudes downward. The arm 23 is stretchable in the fore and aft direction, and thereby supporting the base 24 such that the base 24 is movable in the fore and aft direction with respect to the slider 22.

An image capturing device 26 configured to capture an image of a space above the seat cushion 62 is provided on an upper surface of the base 24. The image capturing device 26 is positioned in front of the operation element 10 so as to be adjacent to the operation element 10.

As shown in FIG. 1, the moving device 16 includes a slider driving mechanism 27 and an arm driving mechanism 28. The slider driving mechanism 27 is configured to move the slider 22 in the lateral direction with respect to the rails 21 by an electric motor. Thereby, the slider 22, the arm 23, the base 24, and the operation element 10 move in the lateral direction with respect to the vehicle body 15. The arm driving mechanism 28 is configured to change a stretching degree of the arm 23 in the fore and aft direction by bending the joints 25 with an electric motor. Thereby, the base 24 and the operation element 10 move in the fore and aft direction with respect to the vehicle body 15. As described above, the moving device 16 is configured to move the operation element 10 in the lateral direction and the fore and aft direction with respect to the vehicle body 15.

The moving device 16 further includes a position sensor 29 configured to detect a position of the operation element 10 in the fore and aft direction. For example, the position sensor 29 is attached to the electric motor that forms the arm driving mechanism 28, or to one of the joints 25 of the arm 23. The position sensor 29 may be, for example, a potentiometer or a rotary encoder.

As shown in FIGS. 3 to 5, the operation element 10 includes a hub 31 provided rotatably on the base 24, a disk 32 (a spoke) provided coaxially with the hub 31 on an outer circumference of the hub 31, and a ring 33 provided on an outer circumference of the disk 32. The disk 32 is formed in a circular plate shape. In the present embodiment, the disk 32 extends radially outward from the hub 31 to a side opposite to the base 24 in a direction of a turning axis A of the operation element 10 (the hub 31), and is formed in a cone shape with the hub 31 on the top thereof. The ring 33 is formed in an annular shape around the turning axis A of the operation element 10 (the hub 31), and has a circular cross section. The cross-sectional diameter of the ring 33 is larger than the thickness of the disk 32. The ring 33 functions as a grip portion gripped by the occupant X to perform a turning operation on the operation element 10.

The hub 31 includes a facing part 31A facing a side of the occupant X and a back part (not shown) opposite to the facing part 31A. The disk 32 includes a facing part 32A facing the side of the occupant X and a back part 32B opposite to the facing part 32A. The ring 33 includes a facing part 33A facing the side of the occupant X, a back part 33B opposite to the facing part 33A, an outer circumferential part 33C provided on outer circumferences of the facing part 33A and the back part 33B, and an inner circumferential part 33D provided on inner circumferences of the facing part 33A and the back part 33B. More specifically, when the ring 33 is divided into two parts with a plane including an outer circumferential edge of the ring 33 (a part where the ring 33 has a maximum diameter around the turning axis A of the operation element 10) and an inner circumferential edge of the ring 33 (a part where the ring 33 has a minimum diameter around the turning axis A of the operation element 10), a part arranged on a side of the base 24 is defined as the back part 33B, while a part arranged on a side opposite to the base 24 is defined as the facing part 33A.

The operation element 10 includes a first surface part 10A, a second surface part 10B opposite to the first surface part 10A, and an outer circumferential part 10C provided on outer circumferences of the first surface part 10A and the second surface part 10B. The first surface part 10A is provided on one side along the turning axis A of the operation element 10, and forms a rear surface (one surface in the fore and aft direction) of the operation element 10. The second surface part 10B is provided on the other side along the turning axis A of the operation element 10, and forms a front surface (the other surface in the fore and aft direction) of the operation element 10. The first surface part 10A includes the facing part 31A of the hub 31, the facing part 32A of the disk 32, and the facing part 33A of the ring 33. The second surface part 10B includes the back part 32B of the disk 32 and the back part 33B of the ring 33. The outer circumferential part 10C includes the outer circumferential part 33C of the ring 33. In another embodiment, the first surface part 10A may include the back part 32B of the disk 32 and the back part 33B of the ring 33, and the second surface part 10B may include the facing part 31A of the hub 31, the facing part 32A of the disk 32, and the facing part 33A of the ring 33.

As shown in FIG. 1, the operation element 10 is provided with a first capacitive sensor 35, a second capacitive sensor 36, and third capacitive sensors 37, which function as contact sensors. The operation element 10 is also provided with a turning angle sensor 38 and a force sensor 39. The turning angle sensor 38 is configured to detect a turning angle of the operation element 10 with respect to the vehicle body 15. The turning angle sensor 38 may be a rotary encoder, a resolver, or the like. In another embodiment, the operation element 10 may be provided with a gyro sensor configured to detect the turning speed of the operation element 10.

The force sensor 39 may be a known piezoelectric sensor or a known strain gauge sensor, and is provided between the base 24 and the hub 31. The force sensor 39 is, for example, a six-axis force sensor configured to detect the loads applied to the operation element 10 to the front side along the turning axis A (one side in the fore and aft direction), to the rear side along the turning axis A (the other side in the fore and aft direction), to the left side (the first side in the lateral direction), to the right side (the second side in the lateral direction), to the upper side along a direction orthogonal to the turning axis A (one side in the up-and-down direction), and to the lower side along the direction orthogonal to the turning axis A (the other side in the up-and-down direction).

Figure 6:
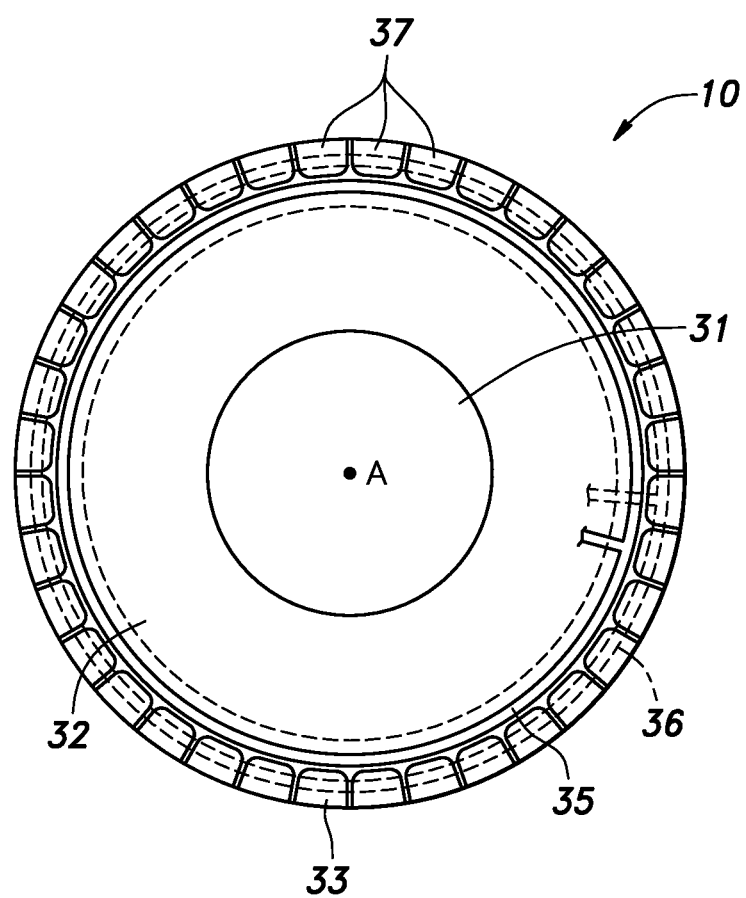
FIG. 6 is an explanatory diagram showing a positional relationship among first to third capacitive sensors provided in the operation element.
Figure 7:
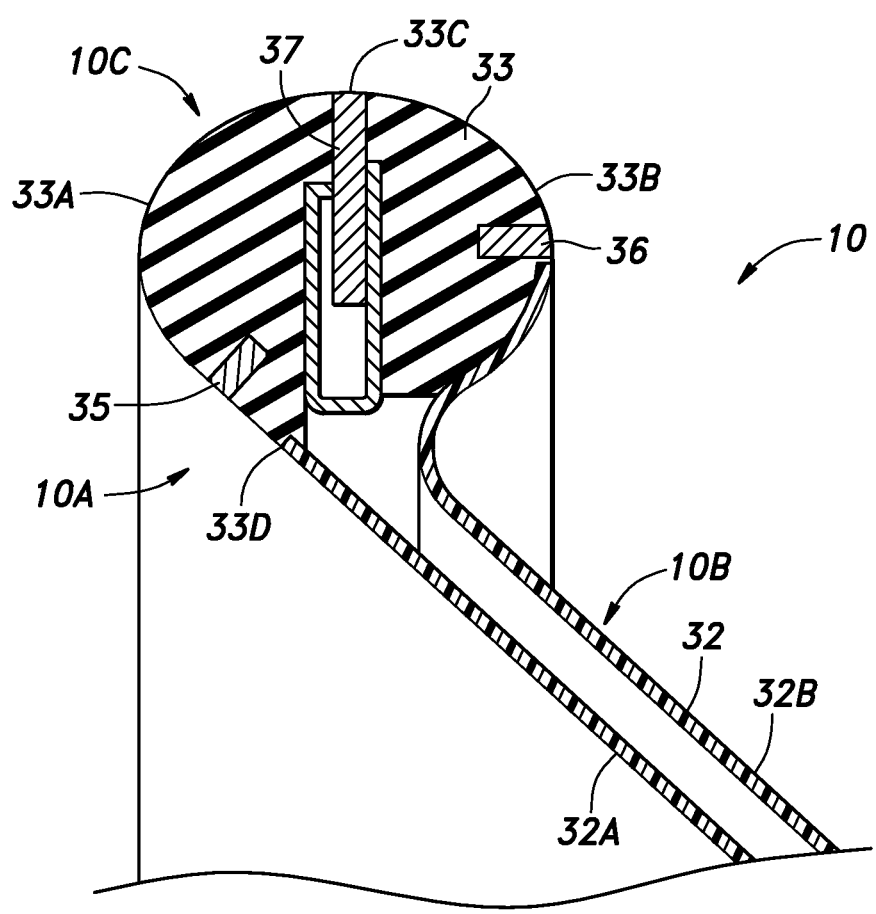
FIG. 7 is a sectional view of the operation element taken along a line VII-VII of FIG. 5.

As shown in FIGS. 4, 6, and 7, the first to third capacitive sensors 35 to 37 are contact sensors configured to detect approach and contact of an object such as the occupant X's hand (finger) according to a change in capacitance. The first to third capacitive sensors 35 to 37 are provided on the ring 33 of the operation element 10.

The first capacitive sensor 35 is provided on the first surface part 10A of the operation element 10, the second capacitive sensor 36 is provided on the second surface part 10B of the operation element 10, and the third capacitive sensors 37 are provided on the outer circumferential part 10C of the operation element 10. More specifically, the first capacitive sensor 35 is provided on the facing part 33A of the ring 33, the second capacitive sensor 36 is provided on the back part 33B of the ring 33, and the third capacitive sensors 37 are provided on the outer circumferential part 33C of the ring 33. In another embodiment, the first capacitive sensor 35 may be provided on the back part 33B of the ring 33, and the second capacitive sensor 36 may be provided on the facing part 33A of the ring 33.

The first capacitive sensor 35 is a single sensor formed in an annular shape and provided coaxially with the ring 33 along the facing part 33A of the ring 33. In another embodiment, plural first capacitive sensors 35 may be arranged in the circumferential direction along the facing part 33A of the ring 33. The first capacitive sensor 35 is preferably provided on an inner circumferential side of the facing part 33A. More specifically, when viewed in the direction along the turning axis A of the operation element 10, the first capacitive sensor 35 is preferably provided on a radially inner side with respect to a center circle that passes through a widthwise central part of the ring 33. Namely, the first capacitive sensor 35 is preferably provided on the inner circumferential part 33D of the ring 33.

The second capacitive sensor 36 is a single sensor formed in an annular shape and provided coaxially with the ring 33 along the back part 33B of the ring 33. In another embodiment, plural second capacitive sensors 36 may be arranged in the circumferential direction along the back part 33B of the ring 33. The second capacitive sensor 36 preferably extends along a widthwise central part of the back part 33B. The second capacitive sensor 36 preferably has a larger diameter than the first capacitive sensor 35.

The third capacitive sensors 37 are provided along an outer edge of the operation element 10 and configured to identify a contact position of the hand of the occupant X (a position of a contact operation by the occupant X). In another embodiment, a single third capacitive sensor 37 may extend along the outer edge of the operation element 10, or plural third capacitive sensors 37 may be divided along the outer edge of the operation element 10. In the present embodiment, the third capacitive sensors 37 are arranged in the circumferential direction along the outer circumferential part 33C of the ring 33, which includes the outer circumferential edge of the ring 33. The third capacitive sensors 37 each have the same angular length in the circumferential direction, and are arranged adjacently to each other at equal intervals. Preferably, the gaps between the adjacent third capacitive sensors 37 are as small as possible. In the present embodiment, thirty-six third capacitive sensors 37 each having an angular length of about 10 degrees are provided.

The first to third capacitive sensors 35 to 37 are configured to output signals corresponding to the capacitance thereof. The capacitance of the first to third capacitive sensors 35 to 37 increases as the object such as the occupant X's hand approaches the respective sensors 35 to 37, as the size of the approaching object increases, and as the relative permittivity of the approaching object increases.

The first to third capacitive sensors 35 to 37 function as grip sensors configured to detect that the operation element 10 is gripped by the occupant X. For example, the first to third capacitive sensors 35 to 37 detect that the operation element 10 is gripped by the occupant X if the capacitance of at least one of the first capacitive sensor 35 and the second capacitive sensor 36 has increased to a prescribed reference value or more and the capacitance of the third capacitive sensors 37 equal to or more than a prescribed number has increased to the prescribed reference value or more. In another embodiment, the first to third capacitive sensors 35 to 37 may be configured to detect that the operation element 10 is gripped by the occupant X according to a detecting method different from the above method.

As shown in FIG. 5, a display 40 as a display unit is provided on the facing part 31A of the hub 31 (a side of the occupant X of the hub 31). The display 40 is formed in a circular shape and occupies 50% or more of the area of the facing part 31A of the hub 31. As shown in FIG. 1, the display 40 is configured to be controlled by an interface control unit 41 of the control device 11, thereby displaying images indicating a driving mode (the autonomous driving mode or the manual driving mode) of the vehicle 2, a travel direction (a future trajectory) of the vehicle 2, the position of a surrounding vehicle traveling around the vehicle 2, the speed of the vehicle 2, or the like. The images displayed on the display 40 may include numerical values and symbols.

A first reaction force applying device 43 (see FIG. 1) configured to apply a reaction force (turning resistance) to the turning (or the turning operation) of the operation element 10 with respect to the vehicle body 15 is provided between the vehicle body 15 and the operation element 10. The first reaction force applying device 43 is, for example, an electric motor, and configured to apply a rotational force of the electric motor to the operation element 10 as the reaction force to the turning of the operation element 10. In the present embodiment, the first reaction force applying device 43 is provided in the base 24, and configured to apply the reaction force to the turning of the hub 31 with respect to the base 24. The first reaction force applying device 43 can restrict the turning of the operation element 10 by applying sufficient turning resistance to the operation element 10. Namely, the first reaction force applying device 43 functions as a turning restriction device configured to restrict the turning of the operation element 10 with respect to the vehicle body 15.

A second reaction force applying device 44 (see FIG. 1) configured to apply a reaction force (movement resistance) to the movement (or the moving operation) of the operation element 10 in a first direction Y along the turning axis A with respect to the vehicle body 15 is provided between the vehicle body 15 and the operation element 10. The second reaction force applying device 44 is, for example, the electric motor that forms the arm driving mechanism 28, and configured to apply a rotational force of the electric motor to the operation element 10 as the reaction force to the movement of the operation element 10 in the fore and aft direction. The second reaction force applying device 44 can restrict the movement of the operation element 10 in the first direction Y by applying sufficient movement resistance to the operation element 10. Namely, the second reaction force applying device 44 functions as a movement restriction device configured to restrict the movement of the operation element 10 in the first direction Y with respect to the vehicle body 15.

As shown in FIG. 1, the control device 11 is connected to a vehicle sensor 45 configured to detect various state quantities of the vehicle 2 and an external environment recognizing device 46 configured to detect environmental information around the vehicle 2. The vehicle sensor 45 includes, for example, a vehicle speed sensor configured to detect the speed of the vehicle 2, an acceleration sensor configured to detect the acceleration of the vehicle 2, and a yaw rate sensor configured to detect the yaw rate of the vehicle 2. The control device 11 is configured to acquire the various state quantities of the vehicle 2 from the vehicle sensor 45.

The external environment recognizing device 46 is configured to acquire surrounding vehicle information and surrounding environment information, thereby outputting the surrounding vehicle information and the surrounding environment information to the control device 11. The external environment recognizing device 46 includes a camera 47 configured to capture an image around the vehicle 2, an object detection sensor 48 such as a laser or a lidar configured to detect an object present around the vehicle 2, and a navigation device 49. The external environment recognizing device 46 is configured to identify lanes (travel paths) and lane markings based on the image captured by the camera 47. Also, the external environment recognizing device 46 is configured to acquire the surrounding vehicle information, which includes information about the position and the speed of the surrounding vehicle traveling around the vehicle 2, based on the image captured by the camera 47 and a detection signal of the object detection sensor 48. Also, the external environment recognizing device 46 is configured to acquire the surrounding environment information, which includes information about a first travel path where the vehicle is traveling, a second travel path adjacent to the first travel path, stores around the vehicle 2, and branch roads around the vehicle 2, based on the position of the vehicle 2 (namely, the own vehicle), map information, and Point of Interest (POI) acquired by the navigation device 49.

<The Driving Operation on the Operation Element 10>

The operation element 10 is configured to receive a first driving operation and a second driving operation as the driving operation. The first driving operation and the second driving operation each include an acceleration/deceleration operation and a steering operation different from each other. The first driving operation is a driving operation performed by touching the operation element 10 (for example, a single tap operation, a double tap operation, a long press operation, and a stroke operation). Accordingly, the movable amount of the operation element 10 according to the first driving operation is zero or extremely small. The second driving operation is a driving operation performed by turning or moving the operation element 10. Accordingly, the movable amount of the operation element 10 according to the second driving operation is larger than that of the operation element 10 according to the first driving operation. In this way, the first driving operation is a contact operation on the operation element 10, while the second driving operation is a turning operation or a moving operation on the operation element 10. Accordingly, it is possible to clearly distinguish the first driving operation and the second driving operation and avoid confusion between the two.

The first driving operation includes a stroke operation in the circumferential direction on the outer circumferential part 33C of the ring 33 by the hand of the occupant X. When the hand of the occupant X strokes the outer circumferential part 33C of the ring 33 in the circumferential direction, the capacitance of the third capacitive sensors 37 arranged in the circumferential direction changes sequentially. The signal processing unit 14 detects the stroke operation on the ring 33 by the occupant X based on the signals from the third capacitive sensors 37. Also, the signal processing unit 14 detects the direction and the length of the stroke operation based on the signals from the third capacitive sensors 37. The travel control unit 12 may control the steering device 4 according to the direction and the length of the stroke operation detected by the signal processing unit 14, thereby moving (offsetting) the vehicle 2 in the vehicle width direction, changing the lanes, and turning the vehicle 2 right or left.

Further, the first driving operation includes the contact operation on the facing part 33A or the back part 33B of the ring 33 by the occupant X. The contact operation includes, for example, a single tap operation, a double tap operation, and a long press operation. When the hand of the occupant X performs the contact operation on the facing part 33A or the back part 33B of the ring 33, the capacitance of the first capacitive sensor 35 or the second capacitive sensor 36 changes. The signal processing unit 14 determines the contact duration and the contact number of the hand of the occupant X based on the detection signal from the first capacitive sensor 35 or the second capacitive sensor 36, thereby determining whether the contact operation is either of a single tap operation, a double tap operation, and a long press operation.

For example, the travel control unit 12 executes the acceleration control in response to the operation on the facing part 33A, and executes the deceleration control in response to the operation on the back part 33B. The acceleration control includes the control to increase the target speed of the vehicle 2 by a predetermined value from the current value, the control to decrease the target vehicle-to-vehicle distance (namely, the distance between the vehicle 2 (namely, the own vehicle) and the preceding vehicle traveling in front of the vehicle 2) by a predetermined value from the current value, and the control to start the movement of the vehicle 2 from a state where the vehicle 2 is stopped. The deceleration control includes the control to decrease the target speed of the vehicle 2 by a predetermined value from the current value, the control to increase the target vehicle-to-vehicle distance by a predetermined value from the current value, and the control to stop the vehicle 2 from a state where the vehicle 2 is traveling at low speed. The travel control unit 12 may change the control to execute or the changing amount of the target speed of the vehicle 2 according to the mode of the operation on the facing part 33A or the back part 33B. For example, the travel control unit 12 may make the changing amount of the target speed of the vehicle 2 in response to a double tap operation larger than that of the target speed of the vehicle 2 in response to a single tap operation. Also, the travel control unit 12 may keep on increasing or decreasing the target speed of the vehicle 2 while a long press operation is being performed on the facing part 33A or the back part 33B.

The second driving operation includes the turning operation on the operation element 10 around the turning axis A and the moving operation (push/pull operation) on the operation element 10 along the turning axis A. When the occupant X performs the turning operation on the operation element 10, the turning angle sensor 38 detects the turning angle of the operation element 10 with respect to the vehicle body 15. The signal processing unit 14 acquires the turning angle of the operation element 10 based on the detection signal from the turning angle sensor 38, and the travel control unit 12 controls the steering device 4 according to the acquired turning angle, thereby steering the wheels of the vehicle 2.

When the occupant X performs the moving operation on the operation element 10 to the front side (namely, when the occupant X pushes the operation element 10), the force sensor 39 detects the load applied to the operation element 10 to the front side. The signal processing unit 14 acquires the load applied to the operation element 10 and the direction of the load based on the detection signal from the force sensor 39, and the travel control unit 12 controls the drive device 5 according to the acquired load and the acquired direction of the load, thereby accelerating the vehicle 2. When the occupant X performs the moving operation on the operation element 10 to the rear side (namely, when the occupant X pulls the operation element 10), the force sensor 39 detects the load applied to the operation element 10 to the rear side. The signal processing unit 14 acquires the load applied to the operation element 10 and the direction of the load based on the detection signal from the force sensor 39, and the travel control unit 12 controls at least one of the drive device 5 and the brake device 6 according to the acquired load and the acquired direction of the load, thereby decelerating the vehicle 2. In another embodiment, the position sensor 29 may detect the moving operation on the operation element 10 by the occupant X, and the travel control unit 12 may execute the acceleration/deceleration control of the vehicle 2 based on the signal from the position sensor 29.

<The Driving Mode of the Vehicle 2>

The travel control unit 12 is configured to switch the driving mode of the vehicle 2 between the autonomous driving mode and the manual driving mode. In the autonomous driving mode, the travel control unit 12 automatically executes the steering operation and the acceleration/deceleration operation. In the manual driving mode, the occupant X manually performs the steering operation and the acceleration/deceleration operation.

In the autonomous driving mode, the travel control unit 12 independently creates a future trajectory of the vehicle 2, thereby controlling the steering device 4, the drive device 5, and the brake device 6. However, even in the autonomous driving mode, the travel control unit 12 receives the first driving operation on the operation element 10 by the occupant X, thereby causing the control of the steering device 4, the drive device 5, and the brake device 6 to reflect the intention of the occupant X. That is, the first driving operation is an auxiliary driving operation in the autonomous driving mode.

In the manual driving mode, the travel control unit 12 controls the steering device 4, the drive device 5, and the brake device 6 according to the second driving operation on the operation element 10 by the occupant X. That is, the second driving operation is an independent driving operation in the manual driving mode. In another embodiment, in the manual driving mode, the travel control unit 12 may control the drive device 5 and the brake device 6 according to a pressing operation on an accelerator pedal or a brake pedal by the occupant X.

<The Position of the Operation Element 10>

With reference to FIG. 2, the operation element 10 is movable among a first position P1 as an allowance position, a second position P2 as an allowance position, and a third position P3 as a restriction position. The first position P1 is located on the left side (the first side in the lateral direction) with respect to the center of the vehicle 2 in the lateral direction, and the second position P2 is located on the right side (the second side in the lateral direction) with respect to the center of the vehicle 2 in the lateral direction. That is, the first position P1 and the second position P2 are offset from each other in the lateral direction and separated from each other. The third position P3 is located at the center of the vehicle 2 in the lateral direction. The third position P3 is located between the first position P1 and the second position P2 in the lateral direction (more specifically, located in the middle of the first position P1 and the second position P2 in the lateral direction), and is offset from the first position P1 and the second position P2 in the lateral direction. The third position P3 is located more forward than the first position P1 and the second position P2 in the fore and aft direction. Accordingly, when the occupant X does not operate the operation element 10 (for example, when the autonomous driving mode is executed or when the occupant X gets on or off the vehicle 2), the operation element 10 is moved to the third position P3, so that the operation element 10 and the occupant X can be separated from each other. Accordingly, it is possible to prevent the operation element 10 from oppressing the occupant X.

In a state where the operation element 10 is located in the first position P1 or the second position P2, the vehicle 2 can travel in the autonomous driving mode and the manual driving mode. More specifically, in a state where the operation element 10 is located in the first position P1 or the second position P2, the travel control unit 12 switches the driving mode of the vehicle 2 between the manual driving mode and the autonomous driving mode according to an operation on a mode change switch 51 (see FIG. 1) by the occupant X. In a state where the operation element 10 is located in the third position P3, the vehicle 2 can travel only in the autonomous driving mode, and the manual driving mode cannot be selected. In a state where the operation element 10 is located between the first position P1 and the third position P3 or between the second position P2 and the third position P3, the vehicle 2 can travel only in the autonomous driving mode, and the manual driving mode cannot be selected.

In a state where the operation element 10 is located in the first position P1 or the second position P2, the operation element 10 can receive both the first driving operation and the second driving operation. More specifically, in a state where the operation element 10 is located in the first position P1 or the second position P2 and the driving mode of the vehicle 2 is set to the autonomous driving mode, the operation element 10 can receive the first driving operation. On the other hand, in a state where the operation element 10 is located in the first position P1 or the second position P2 and the driving mode of the vehicle 2 is set to the manual driving mode, the operation element 10 can receive the second driving operation.

In a state where the operation element 10 is located in the third position P3, between the first position P1 and the third position P3, or between the second position P2 and the third position P3, the driving mode of the vehicle 2 is set to the autonomous driving mode, and the operation element 10 can receive the first driving operation and cannot receive the second driving operation. Thus, in the third position P3 where the operation element 10 and the occupant X are separated from each other, it is possible to prevent the execution of the second driving operation, which makes the movable amount of the operation element 10 relatively large. Accordingly, it is possible to prevent an erroneous operation on the operation element 10 located in the third position P3.

<The Shift Range of the Vehicle 2>

With reference to FIG. 1, the vehicle 2 (more specifically, the control device 11) includes a shift range control unit 70 configured to control a shift range of the vehicle 2. The shift range control unit 70 is configured to transition the shift range of the vehicle 2 according to the contact operation (for example, a tap operation) on the operation element 10 by the occupant X. The shift range control unit 70 is configured to transition the shift range of the vehicle 2 at least among a forward range (an example of a first travel range), a reverse range (an example of a second travel range), a neutral range, and a parking range. The forward range is a shift range to cause the vehicle 2 to travel forward. The reverse range is a shift range to reverse the vehicle 2. The neutral range is a shift range in which the wheels are rotatable and the driving force of the drive device 5 is not transmitted to the wheels. The parking range is a shift range in which the rotation of the wheels is restricted and the driving force of the drive device 5 is not transmitted to the wheels.

<The Acceleration/Deceleration Operation on the Operation Element 10>

As shown in FIGS. 3 and 4, the operation element 10 is movable in the first direction Y along the turning axis A with respect to the vehicle body 15. The operation element 10 may move in the first direction Y with respect to the base 24, or may move in the first direction Y together with the base 24 as the arm 23 stretches or contracts.

Figure 8:
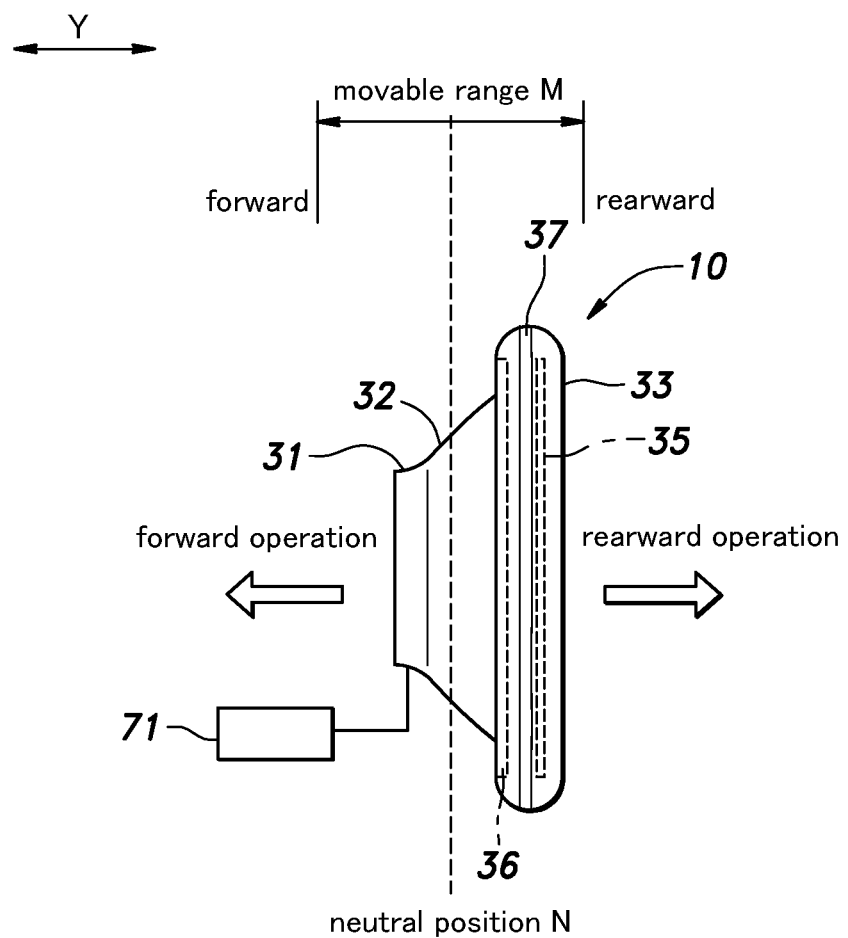
FIG. 8 is an explanatory diagram showing a forward operation and a rearward operation on the operation element.

As shown in FIG. 1, the control device 11 includes a stroke setting unit 72. As shown in FIG. 8, the stroke setting unit 72 is configured to set a movable range M of the operation element 10 in the first direction Y and a neutral position N in the movable range M. In the following, an operation to push the operation element 10 forward (an example of a first travel direction of the vehicle 2; a direction toward a first side in the first direction Y) from the neutral position N, namely, a forward moving operation on the operation element 10 will be referred to as "the forward operation". On the other hand, an operation to pull the operation element 10 rearward (an example of a second travel direction of the vehicle 2; a direction toward a second side in the first direction Y) from the neutral position N, namely, a rearward moving operation on the operation element 10 will be referred to as "the rearward operation". The operation element 10 is biased to the neutral position N by a biasing member 71 such as a spring or an electric motor.

<The Travel of the Vehicle 2>

When the occupant X grips the operation element 10 and performs the forward operation on the operation element 10 in a state where the shift range of the vehicle 2 is set to the forward range, the operation element 10 moves forward from the neutral position N with respect to the vehicle body 15 against a biasing force of the biasing member 71. Accordingly, the force sensor 39 detects a forward load applied to the operation element 10. Thereby, the travel control unit 12 controls the drive device 5 according to the detection signal from the force sensor 39, and thus executes the acceleration control to accelerate the vehicle 2. In another embodiment, the travel control unit 12 may control the drive device 5 according to a detection signal from the position sensor 29, and thus execute the acceleration control to accelerate the vehicle 2 which is traveling forward.

When the occupant X stops the forward operation on the operation element 10, the operation element 10 moves rearward with respect to the vehicle body 15 by the biasing force of the biasing member 71, and then stops at the neutral position N. Accordingly, the force sensor 39 ceases to detect the forward load applied to the operation element 10, and thus the travel control unit 12 stops the acceleration control.

When the occupant X grips the operation element 10 and performs the rearward operation on the operation element 10 in the state where the shift range of the vehicle 2 is set to the forward range, the operation element 10 moves rearward from the neutral position N with respect to the vehicle body 15 against the biasing force of the biasing member 71. Accordingly, the force sensor 39 detects a rearward load applied to the operation element 10. Thereby, the travel control unit 12 controls at least one of the drive device 5 and the brake device 6 according to the detection signal from the force sensor 39, and thus executes the deceleration control to decelerate the vehicle 2. In another embodiment, the travel control unit 12 may control at least one of the drive device 5 and the brake device 6 according to the detection signal from the position sensor 29, and thus execute the deceleration control to decelerate the vehicle 2 which is traveling forward.

When the occupant X stops the rearward operation on the operation element 10, the operation element 10 moves forward with respect to the vehicle body 15 by the biasing force of the biasing member 71, and then stops at the neutral position N. Accordingly, the force sensor 39 ceases to detect the rearward load applied to the operation element 10, and thus the travel control unit 12 stops the deceleration control.

When the occupant X grips the operation element 10 and performs the rearward operation on the operation element 10 in a state where the shift range of the vehicle 2 is set to the reverse range, the operation element 10 moves rearward from the neutral position N with respect to the vehicle body 15 against the biasing force of the biasing member 71. Accordingly, the force sensor 39 detects the rearward load applied to the operation element 10. Thereby, the travel control unit 12 controls the drive device 5 according to the detection signal from the force sensor 39, and thus executes the acceleration control to accelerate the vehicle 2 which is reversing.

When the occupant X stops the rearward operation on the operation element 10, the operation element 10 moves forward with respect to the vehicle body 15 by the biasing force of the biasing member 71, and then stops at the neutral position N. Accordingly, the force sensor 39 ceases to detect the rearward load applied to the operation element 10, and thus the travel control unit 12 stops the acceleration control.

When the occupant X grips the operation element 10 and performs the forward operation on the operation element 10 in the state where the shift range of the vehicle 2 is set to the reverse range, the operation element 10 moves forward from the neutral position N with respect to the vehicle body 15 against the biasing force of the biasing member 71. Accordingly, the force sensor 39 detects the forward load applied to the operation element 10. Thereby, the travel control unit 12 controls at least one of the drive device 5 and the brake device 6 according to the detection signal from the force sensor 39, and thus executes the deceleration control to decelerate the vehicle 2 which is reversing.

When the occupant X stops the forward operation on the operation element 10, the operation element 10 moves rearward with respect to the vehicle body 15 by the biasing force of the biasing member 71, and then stops at the neutral position N. Accordingly, the force sensor 39 ceases to detect the forward load applied to the operation element 10, and thus the travel control unit 12 stops the deceleration control.

By the way, the travel control unit 12 may always execute the acceleration/deceleration control such that the vehicle 2 is accelerated according to the forward operation on the operation element 10 and decelerated according to the rearward operation on the operation element 10. However, if the travel control unit 12 always executes the acceleration/deceleration control in this way, the following problem will occur. When the vehicle 2 is traveling forward, the vehicle 2 accelerates according to the forward operation on the operation element 10, and thus the travel direction of the vehicle 2 matches the direction of the acceleration operation on the operation element 10. On the other hand, when the vehicle 2 is reversing (namely, when the vehicle 2 is traveling rearward), the vehicle 2 accelerates according to the forward operation on the operation element 10, and thus the travel direction of the vehicle 2 becomes opposite to the direction of the acceleration operation on the operation element 10. As a result, the occupant X cannot intuitively perform the acceleration/deceleration operation on the operation element 10, which may deteriorate the operability of the acceleration/deceleration operation on the operation element 10.

In view of such a problem, in the present embodiment, in the state where the shift range of the vehicle 2 is set to the forward range, the travel control unit 12 accelerates the vehicle 2 according to the forward operation on the operation element 10 and decelerates the vehicle 2 according to the rearward operation on the operation element 10. On the other hand, in the state where the shift range of the vehicle 2 is set to the reverse range, the travel control unit 12 accelerates the vehicle 2 according to the rearward operation on the operation element 10 and decelerates the vehicle 2 according to the forward operation on the operation element 10. Accordingly, both when the vehicle 2 is traveling forward and when the vehicle 2 is reversing (namely, when the vehicle 2 is traveling rearward), the travel direction of the vehicle 2 matches the direction of the acceleration/deceleration operation (namely, the moving operation) on the operation element 10. Accordingly, both when the vehicle 2 is traveling forward and when the vehicle 2 is reversing, the occupant X can intuitively perform the acceleration/deceleration operation on the operation element 10, so that the operability of the acceleration/deceleration operation on the operation element 10 can be improved.

Also, the direction along the turning axis A of the operation element 10 is set to the first direction Y, the direction toward the first side in the first direction Y is set to "forward" and the direction toward the second side in the first direction Y is set to "rearward", and the operation element 10 is configured to receive the turning operation around the turning axis A. According to such a configuration, a single operation element 10 can receive both the acceleration/deceleration operation (namely, the moving operation) and the steering operation (namely, the turning operation). Accordingly, the configuration of the vehicle control system 1 can be simplified as compared with a case where separate operation elements 10 receive the acceleration/deceleration operation and the steering operation. Further, in a case where the occupant X intends to turn the vehicle 2 while reversing the vehicle 2, the occupant X can turn the operation element 10 while moving the operation element 10 rearward so as to pull the operation element 10 close to the occupant X, so that the occupant X can easily operate the operation element 10.

<The Vehicle Travel Control in the Reverse Range>

Figure 9:
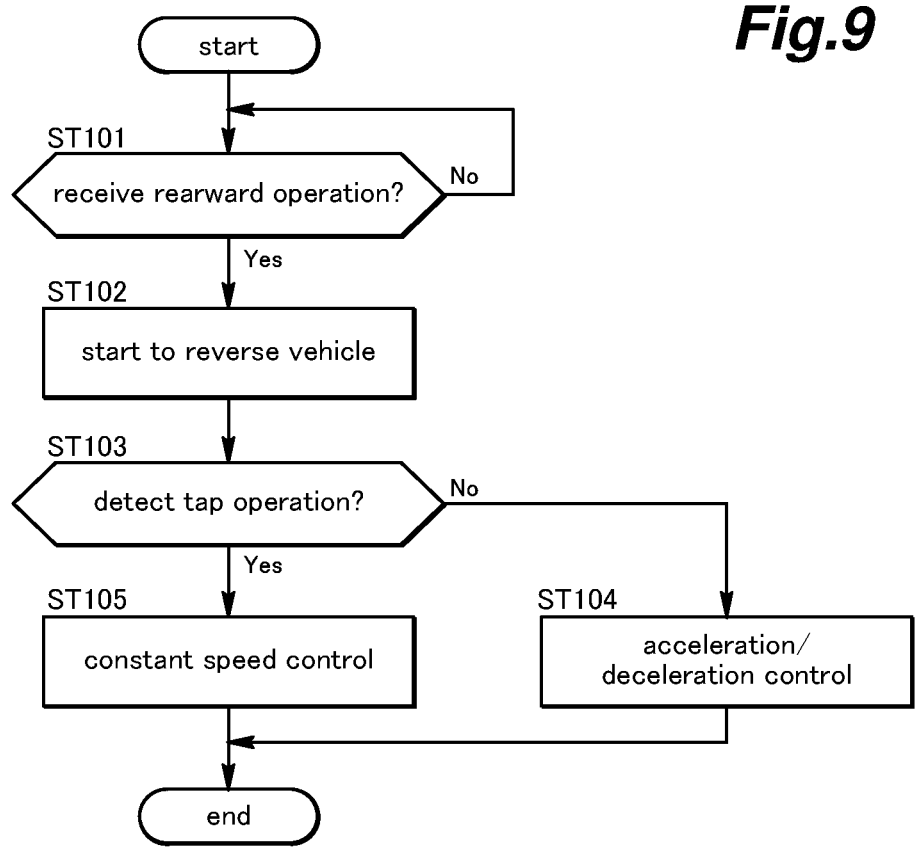
FIG. 9 is a flowchart showing vehicle travel control in a reverse range.

Next, with reference to FIG. 9, the vehicle travel control in the reverse range will be described. In the following, it is assumed that the shift range of the vehicle 2 is set to the reverse range at the start of the vehicle travel control in the reverse range.

First, the travel control unit 12 determines whether the operation element 10 receives the rearward operation based on the detection signal from the force sensor 39 (step ST101).

In a case where the occupant X does not perform the rearward operation on the operation element 10, the determination in step ST101 results in "No". In this case, the travel control unit 12 repeats the determination in step ST101 at regular time intervals until the determination in step ST101 becomes "Yes". Incidentally, in a case where the determination in step ST101 remains "No" for the prescribed number of times or more in succession, the shift range control unit 70 may transition the shift range of the vehicle 2 from the reverse range to the forward range.

On the other hand, when the occupant X performs the rearward operation on the operation element 10, the determination in step ST101 results in "Yes". In this case, the travel control unit 12 starts to reverse the vehicle 2 (step ST102).

Next, the travel control unit 12 determines whether the first to third capacitive sensors 35 to 37 detect the tap operation based on the detection signals from the first to third capacitive sensors 35 to 37 (step ST103). In another embodiment, the travel control unit 12 may determine whether the first to third capacitive sensors 35 to 37 detect a contact operation other than the tap operation (for example, a stroke operation or a long press operation).

In a case where the occupant X does not simultaneously perform the rearward operation and the tap operation on the operation element 10, the determination in step ST103 results in "No". In this case, the travel control unit 12 normally executes the acceleration/deceleration control of the vehicle 2 (step ST104). Namely, the travel control unit 12 accelerates the vehicle 2 according to the rearward operation on the operation element 10 and decelerates the vehicle 2 according to the forward operation on the operation element 10.

On the other hand, in a case where the occupant X simultaneously performs the rearward operation and the tap operation on the operation element 10, the determination in step ST103 results in "Yes". In this case, the travel control unit 12 executes constant speed control (cruise control) in which a vehicle speed at a time when the first to third capacitive sensors 35 to 37 detect the tap operation is set to a target speed (step ST105). Accordingly, the operation load on the occupant X can be reduced. In another embodiment, in a case where the determination in step ST103 results in "Yes", the travel control unit 12 may execute constant speed control in which not a vehicle speed at a time when the first to third capacitive sensors 35 to 37 detect the tap operation but a vehicle speed preset by the occupant X is set to a target speed.

<The Rearward Check Determination and the Area Determination>

As shown in FIG. 1, the control device 11 includes a rearward check determining unit 73 (an example of a check determining unit). The rearward check determining unit 73 is configured to determine whether the occupant X checks behind the vehicle 2 (namely, whether the occupant X checks the rearward direction) based on an image of the occupant X (hereinafter referred to as "the occupant image") captured by the image capturing device 26.

For example, the rearward check determining unit 73 is configured to detect the direction of the face of the occupant X based on the occupant image. In a case where the face of the occupant X is directed rearward, the rearward check determining unit 73 determines that the occupant X checks behind the vehicle 2. In a case where the face of the occupant X is not directed rearward, the rearward check determining unit 73 determines that the occupant X does not check behind the vehicle 2. Alternatively, the rearward check determining unit 73 is configured to detect the direction of the sight-line of the occupant X based on the occupant image. In a case where the sight-line of the occupant X is directed to a rearward check device (for example, a rearview mirror, a side mirror, or a rear monitor), the rearward check determining unit 73 determines that the occupant X checks behind the vehicle 2. In a case where the sight-line of the occupant X is not directed to the rearward check device, the rearward check determining unit 73 determines that the occupant X does not check behind the vehicle 2.

As shown in FIG. 1, the control device 11 includes an area determining unit 74. The area determining unit 74 is configured to determine whether the vehicle 2 is present in a reversing area where the vehicle 2 can reverse (an example of an area where the vehicle 2 can travel in the second travel range) based on the current position of the vehicle 2 or the surrounding information about the vehicle 2 detected by the external environment recognizing device 46.

For example, in a case where the current position of the vehicle 2 detected by the navigation device 49 of the external environment recognizing device 46 is present in a prescribed area (for example, a parking lot), the area determining unit 74 determines that the vehicle 2 is present in the reversing area. In a case where the current position of the vehicle 2 detected by the navigation device 49 of the external environment recognizing device 46 is not present in the prescribed area, the area determining unit 74 determines that the vehicle 2 is not present in the reversing area. Also, in a case where the object detection sensor 48 of the external environment recognizing device 46 does not detect the object around the vehicle 2, the area determining unit 74 determines that the vehicle 2 is present in the reversing area. In a case where the object detection sensor 48 of the external environment recognizing device 46 detects the object around the vehicle 2, the area determining unit 74 determines that the vehicle 2 is not present in the reversing area.

<The Transition Control of the Shift Range>

Next, the control to transition the shift range of the vehicle 2 (hereinafter referred to as "the transition control of the shift range") will be described with reference to FIG. 10. In the following, it is assumed that the shift range of vehicle 2 is set to the forward range at the start of the transition control of the shift range.

First, the shift range control unit 70 determines whether the vehicle 2 is stopped (namely, whether the vehicle 2 is in a stopped state) based on the speed of the vehicle 2 detected by the vehicle speed sensor included in the vehicle sensor 45 (step ST201). In another embodiment, the shift range control unit 70 may determine whether the speed of the vehicle 2 is equal to or less than a prescribed reference speed based on the speed of the vehicle 2 detected by the vehicle speed sensor included in the vehicle sensor 45.

In a case where the vehicle 2 is traveling, the determination in step ST201 results in "No". In this case, the shift range control unit 70 does not transition the shift range of the vehicle 2 from the forward range to the reverse range (step ST202).

On the other hand, in a case where the vehicle 2 is stopped, the determination in step ST201 results in "Yes". In this case, the rearward check determining unit 73 determines whether the occupant X checks behind the vehicle 2 based on the occupant image (step ST203).

In a case where the occupant X does not check behind the vehicle 2, the determination in step ST203 results in "No". In this case, the shift range control unit 70 does not transition the shift range of the vehicle 2 from the forward range to the reverse range (step ST202).

On the other hand, in a case where the occupant X checks behind the vehicle 2, the determination in step ST203 results in "Yes". In this case, the shift range control unit 70 determines whether the first to third capacitive sensors 35 to 37 detect the tap operation based on the detection signals from the first to third capacitive sensors 35 to 37 (step ST204). In another embodiment, the shift range control unit 70 may determine whether the first to third capacitive sensors 35 to 37 detect a contact operation other than the tap operation (for example, a stroke operation or a long press operation).

In a case where the occupant X does not perform the tap operation on the operation element 10, the determination in step ST204 results in "No". In this case, the shift range control unit 70 does not transition the shift range of the vehicle 2 from the forward range to the reverse range (step ST202).

On the other hand, in a case where the occupant X performs the tap operation on the operation element 10, the determination in step ST204 results in "Yes". In this case, the shift range control unit 70 transitions the shift range of the vehicle 2 from the forward range to the reverse range (step ST205).

In the present embodiment, on condition that the rearward check determining unit 73 determines that the occupant X checks behind the vehicle 2 in the state where the shift range of the vehicle 2 is set to the forward range, the shift range control unit 70 transitions the shift range of the vehicle 2 from the forward range to the reverse range. By setting such a condition, the shift range of the vehicle 2 can be transitioned according to the rearward check by the occupant X. Thus, the shift range of the vehicle 2 can be transitioned based on the intention of the occupant X.

Also, on condition that the first to third capacitive sensors 35 to 37 detect the tap operation on the operation element 10 in the state where the shift range of the vehicle 2 is set to the forward range, the shift range control unit 70 transitions the shift range of the vehicle 2 from the forward range to the reverse range. By setting such a condition, the shift range of the vehicle 2 can be transitioned according to the tap operation on the operation element 10 by the occupant X. Thus, the shift range of the vehicle 2 can be transitioned based on the intention of the occupant X.

In the present embodiment, in step ST204, the shift range control unit 70 determines whether the operation element 10 receives the tap operation. In another embodiment, in step ST204, the shift range control unit 70 may determine whether the operation element 10 receives the rearward operation from the neutral position N. Accordingly, on condition that the operation element 10 receives the rearward operation from the neutral position N in a state where the vehicle 2 stops traveling, the shift range control unit 70 can transition the shift range of the vehicle 2 from the forward range to the reverse range. By setting such a condition, the shift range of the vehicle 2 can be transitioned according to the rearward operation on the operation element 10 by the occupant X. Thus, the shift range of the vehicle 2 can be transitioned based on the intention of the occupant X.

In the present embodiment, in step ST204, the shift range control unit 70 determines whether the operation element 10 receives the tap operation. In another embodiment, in step ST204, the area determining unit 74 may determine whether the vehicle 2 is present in the reversing area where the vehicle 2 can reverse. Accordingly, on condition that the area determining unit 74 determines that the vehicle 2 is present in the reversing area, the shift range control unit 70 can transition the shift range of the vehicle 2 from the forward range to the reverse range. By setting such a condition, the vehicle 2 can reverse in an appropriate area.

In the present embodiment, the transition control of the shift range is executed in a case where the shift range of the vehicle 2 transitions from the forward range to the reverse range. In another embodiment, the transition control of the shift range may be executed in a case where the shift range of the vehicle 2 transitions from the neutral range or the parking range to the reverse range.

Also, in a case where the shift range of the vehicle 2 transitions from the reverse range to the forward range, partially changed control in which the above transition control of the shift range is partially changed may be executed. In step ST203 of the partially changed control, a forward check determining unit (not shown) may determine whether the occupant X checks the front of the vehicle 2 based on the occupant image. Also, in step ST204 of the partially changed control, the shift range control unit 70 may determine whether the operation element 10 receives the forward operation from the neutral position N.

<The Control in a Case where the Forward Operation or the Rearward Operation on the Operation Element 10 is Stopped>

Next, the control in a case where the forward operation or the rearward operation on the operation element 10 is stopped will be described.

In a case where the forward operation or the rearward operation on the operation element 10 is stopped in the state where the shift range of the vehicle 2 is set to the forward range, the shift range control unit 70 maintains the shift range of the vehicle 2 at the forward range without transitioning the shift range of the vehicle 2. In this way, in a case where the forward operation or the rearward operation is stopped in the state where the shift range of the vehicle 2 is set to the forward range whose frequency of use is relatively high, the shift range of the vehicle 2 is maintained at the forward range, so that the convenience of the vehicle control system 1 can be improved.

On the other hand, in a case where the forward operation or the rearward operation on the operation element 10 is stopped in the state where the shift range of the vehicle 2 is set to the reverse range, the shift range control unit 70 transitions the shift range of the vehicle 2 from the reverse range to the neutral range or the parking range. In this way, in a case where the forward operation or the rearward operation on the operation element 10 is stopped in the state where the shift range of the vehicle 2 is set to the reverse range whose frequency of use is relatively low, the shift range of the vehicle 2 is transitioned from the reverse range to the neutral range or the parking range. Accordingly, it is possible to check whether the occupant X intends to reverse the vehicle 2 every time the forward operation or the rearward operation is stopped. In another embodiment, in a case where the forward operation or the rearward operation on the operation element 10 is stopped for a prescribed reference time or more in the state where the shift range of the vehicle 2 is set to the reverse range, the shift range control unit 70 may transition the shift range of the vehicle 2 from the reverse range to the neutral range or the parking range.

<The Reference Intervals of the Rearward Check Determination>

Reference intervals are set with regard to the rearward check determination by the rearward check determining unit 73. The reference intervals may be time intervals (for example, 10 seconds) or space intervals (for example, 10 m).

In a state where the shift range of the vehicle 2 is set to the reverse range and the vehicle 2 is traveling, the rearward check determining unit 73 determines, at the above reference intervals, whether the occupant X checks behind the vehicle 2. While the rearward check determining unit 73 keeps on determining, at the reference intervals, that the occupant X checks behind the vehicle 2, the travel control unit 12 keeps on causing the vehicle 2 to travel. On the other hand, in a case where the rearward check determining unit 73 determines that the occupant X does not check behind the vehicle 2, the travel control unit 12 stops causing the vehicle 2 to travel. By executing this control, it is possible to keep on reversing the vehicle 2 on condition that the occupant X keeps on checking behind the vehicle 2. Thus, the vehicle 2 can keep on reversing based on the intention of the occupant X.

<The Threshold of the Operation Amount of the Rearward Operation on the Operation Element 10>

A threshold of the operation amount is set with regard to the rearward operation on the operation element 10. The threshold of the operation amount may be a threshold of the operation speed of the rearward operation or a threshold of the operation stroke of the rearward operation.

In a case where the operation element 10 receives the rearward operation equal to or less than the threshold of the operation amount in the state where the shift range of the vehicle 2 is set to the reverse range, the travel control unit 12 accelerates the vehicle 2 according to the magnitude of the operation amount. On the other hand, in a case where the operation element 10 receives the rearward operation more than the threshold of the operation amount in the state where the shift range of the vehicle 2 is set to the reverse range, the travel control unit 12 stops acceleration of the vehicle 2. Accordingly, the vehicle 2 can be prevented from reversing at unnecessarily high speed.

Concrete embodiments of the present invention have been described in the foregoing, but the present invention should not be limited by the foregoing embodiments and various modifications and alterations are possible within the scope of the present invention.

The invention claimed is:

1. A vehicle control system comprising:
an operation element movable in a first travel direction and a second travel direction of a vehicle with respect to a vehicle body;
a travel control unit configured to accelerate or decelerate the vehicle according to a moving operation on the operation element in the first travel direction or the second travel direction; and
a shift range control unit configured to control a shift range of the vehicle,
wherein in a state where the shift range of the vehicle is set to a first travel range, the travel control unit accelerates the vehicle according to the moving operation on the operation element in the first travel direction and decelerates the vehicle according to the moving operation on the operation element in the second travel direction, and
in a state where the shift range of the vehicle is set to a second travel range, the travel control unit accelerates the vehicle according to the moving operation on the operation element in the second travel direction and decelerates the vehicle according to the moving operation on the operation element in the first travel direction.

2. The vehicle control system according to claim 1, wherein in a case where the moving operation on the operation element in the first travel direction or the second travel direction is stopped in the state where the shift range of the vehicle is set to the first travel range, the shift range control unit maintains the shift range of the vehicle at the first travel range, and
in a case where the moving operation on the operation element in the first travel direction or the second travel direction is stopped in the state where the shift range of the vehicle is set to the second travel range, the shift range control unit transitions the shift range of the vehicle from the second travel range to a neutral range or a parking range.

3. The vehicle control system according to claim 1, wherein a direction along an axis of the operation element is set to a first direction,
a direction toward a first side in the first direction is set to the first travel direction and a direction toward a second side in the first direction is set to the second travel direction, and
the operation element is configured to receive a turning operation around the axis.

4. The vehicle control system according to claim 1, further comprising a contact sensor configured to detect a contact operation on the operation element,
wherein on condition that the contact sensor detects a prescribed contact operation on the operation element in the state where the shift range of the vehicle is set to the first travel range, the shift range control unit transitions the shift range of the vehicle from the first travel range to the second travel range.

5. The vehicle control system according to claim 1, wherein on condition that the operation element receives the moving operation in the second travel direction in a state where the shift range of the vehicle is set to the first travel range and the vehicle stops traveling, the shift range control unit transitions the shift range of the vehicle from the first travel range to the second travel range.

6. The vehicle control system according to claim 1, further comprising:
an external environment recognizing device configured to detect a current position of the vehicle or surrounding information about the vehicle; and
an area determining unit configured to determine whether the vehicle is present in an area where the vehicle can travel in the second travel range based on the current position of the vehicle or the surrounding information about the vehicle detected by the external environment recognizing device,
wherein on condition that the area determining unit determines that the vehicle is present in the area where the vehicle can travel in the second travel range in the state where the shift range of the vehicle is set to the first travel range, the shift range control unit transitions the shift range of the vehicle from the first travel range to the second travel range.

7. The vehicle control system according to claim 1, further comprising:
an image capturing device configured to capture an image of an occupant; and a check determining unit configured to determine whether the occupant checks the second travel direction based on the image of the occupant captured by the image capturing device, wherein on condition that the check determining unit determines that the occupant checks the second travel direction in the state where the shift range of the vehicle is set to the first travel range, the shift range control unit transitions the shift range of the vehicle from the first travel range to the second travel range.

8. The vehicle control system according to claim 1, further comprising a contact sensor configured to detect a contact operation on the operation element, wherein when the operation element receives the moving operation in the second travel direction and the contact sensor detects a prescribed contact operation on the operation element in the state where the shift range of the vehicle is set to the second travel range, the travel control unit executes constant speed control of the vehicle.

9. The vehicle control system according to claim 1, further comprising:

an image capturing device configured to capture an image of an occupant; and a check determining unit configured to determine whether the occupant checks the second travel direction based on the image of the occupant captured by the image capturing device, wherein while the check determining unit keeps on determining, at prescribed reference intervals, that the occupant checks the second travel direction in a state where the shift range of the vehicle is set to the second travel range and the vehicle is traveling, the travel control unit keeps on causing the vehicle to travel.

10. The vehicle control system according to claim 1, wherein in a case where the operation element receives the moving operation in the second travel direction more than a threshold of an operation amount in the state where the shift range of the vehicle is set to the second travel range, the travel control unit stops acceleration of the vehicle.

11. The vehicle control system according to claim 1, wherein the first travel direction is a forward direction, the second travel direction is a rearward direction, the first travel range is a forward range to cause the vehicle to travel forward, and the second travel range is a reverse range to reverse the vehicle.

\* \* \* \* \*